United States Patent
Kaul et al.

(10) Patent No.: US 10,824,755 B2
(45) Date of Patent: Nov. 3, 2020

(54) EDIT DISTANCE COMPUTATION ON ENCRYPTED DATA

(71) Applicant: International Business Machines Corporation, Armonk, NY (US)

(72) Inventors: Akshar Kaul, Bangalore (IN); Sameep Mehta, New Delhi (IN); Shashank Srivastava, Benares (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 16/157,845

(22) Filed: Oct. 11, 2018

(65) Prior Publication Data

US 2020/0117821 A1    Apr. 16, 2020

(51) Int. Cl.
| | |
|---|---|
| *G06F 21/62* | (2013.01) |
| *H04L 9/00* | (2006.01) |
| *G06F 21/60* | (2013.01) |

(52) U.S. Cl.
CPC ........ *G06F 21/6227* (2013.01); *G06F 21/602* (2013.01); *G06F 21/6272* (2013.01); *H04L 9/008* (2013.01)

(58) Field of Classification Search
CPC .............. G16B 50/40; G06F 21/602; G06F 21/6218–6272; H04L 9/008; H04L 9/0894–0897; H04L 63/0428
See application file for complete search history.

(56) References Cited

U.S. PATENT DOCUMENTS

| | | |
|---|---|---|
| 2010/0246812 A1 | 9/2010 | Rane et al. |
| 2011/0194691 A1 | 8/2011 | Rane et al. |
| 2014/0280342 A1* | 9/2014 | Litherland ............. G06F 16/22 707/780 |
| 2016/0110500 A1 | 4/2016 | Wang et al. |
| 2019/0121873 A1* | 4/2019 | Woodworth .......... G06F 16/148 |
| 2020/0125563 A1* | 4/2020 | Fan ....................... H04L 9/0894 |

FOREIGN PATENT DOCUMENTS

CN        105488422 A        4/2016

OTHER PUBLICATIONS

Cheon, Jung Hee et al., "Homomorphic Computation of Edit Distance", Jan. 8, 2015, 15 pages, ACM Digital Library.

\* cited by examiner

*Primary Examiner* — Kevin Bechtel
(74) *Attorney, Agent, or Firm* — Ference & Associates LLC (57) ABSTRACT

One embodiment provides a method, including: receiving, at a third-party storage provider and from a data owner, a plurality of encrypted documents, wherein each of the plurality of encrypted documents is encrypted by the data owner using at least one encryption key; receiving, from a query user, an encrypted query, wherein the query is encrypted using the at least one encryption key; computing an edit distance value between the encrypted query and at least a portion of the plurality of encrypted documents, wherein the computing comprises communicating with an entity to work together to compute the edit distance value; the communicating comprising (i) providing, from the third-party storage provider to the entity, an encrypted function of an edit distance matrix and (ii) receiving an encrypted edit distance value computed by the entity from the encrypted function; and returning the encrypted edit distance value to the query user.

20 Claims, 3 Drawing Sheets

EDIT DISTANCE COMPUTATION ON ENCRYPTED DATA

BACKGROUND

Digital data are created and stored at many different enterprises. Storing and managing data require physical storage space to store the data. Additionally, the storage and management of the data require software to organize, access, and otherwise manage the data. Typically, it is the data owner, the entity that is capturing and/or storing the data, who is responsible for the storage and management of the data. However, the storage and management of the data can be very expensive. Additionally, the costs increase as the volume of data that needs to be stored and managed increases.

Thus, many data owners may outsource the storage and management of data to a third party, for example, a third-party database service provider, also referred to as, a third-party storage provider. The third-party storage provider may also provide analytics in addition to the storage of data. Many of these third-party database service providers are cloud service providers that are accessible over an Internet connection. Such a model allows both client devices and the data owner to access the data in the third-party database service provider. This model eliminates the need for the data owner to purchase and manage expensive hardware and software to store and manage the data.

BRIEF SUMMARY

In summary, one aspect of the invention provides a method comprising: receiving, at a third-party storage provider and from a data owner, a plurality of encrypted documents, wherein each of the plurality of encrypted documents is encrypted by the data owner using at least one encryption key; receiving, at the third-party storage provider from a query user, an encrypted query, wherein the query is encrypted using the at least one encryption key; computing, at the third-party storage provider, an edit distance value between the encrypted query and at least a portion of the plurality of encrypted documents, wherein the computing comprises communicating with an entity to work together to compute the edit distance value, wherein the entity is provided the at least one encryption key from the data owner; the communicating comprising (i) providing, from the third-party storage provider to the entity, an encrypted function of an edit distance matrix and (ii) receiving, from the entity at the third-party storage provider, an encrypted edit distance value computed by the entity from the encrypted function of the edit distance matrix; and returning, from the third-party storage provider, the encrypted edit distance value to the query user.

Another aspect of the invention provides an apparatus, comprising: at least one processor; and a computer readable storage medium having computer readable program code embodied therewith and executable by the at least one processor, the computer readable program code comprising: computer readable program code configured to receive, at a third-party storage provider and from a data owner, a plurality of encrypted documents, wherein each of the plurality of encrypted documents is encrypted by the data owner using at least one encryption key; computer readable program code configured to receive, at the third-party storage provider from a query user, an encrypted query, wherein the query is encrypted using the at least one encryption key; computer readable program code configured to compute, at the third-party storage provider, an edit distance value between the encrypted query and at least a portion of the plurality of encrypted documents, wherein the computing comprises communicating with an entity to work together to compute the edit distance value, wherein the entity is provided the at least one encryption key from the data owner; the communicating comprising (i) providing, from the third-party storage provider to the entity, an encrypted function of an edit distance matrix and (ii) receiving, from the entity at the third-party storage provider, an encrypted edit distance value computed by the entity from the encrypted function of the edit distance matrix; and computer readable program code configured to return, from the third-party storage provider, the encrypted edit distance value to the query user.

An additional aspect of the invention provides a computer program product, comprising: a computer readable storage medium having computer readable program code embodied therewith, the computer readable program code executable by a processor and comprising: computer readable program code configured to receive, at a third-party storage provider and from a data owner, a plurality of encrypted documents, wherein each of the plurality of encrypted documents is encrypted by the data owner using at least one encryption key; computer readable program code configured to receive, at the third-party storage provider from a query user, an encrypted query, wherein the query is encrypted using the at least one encryption key; computer readable program code configured to compute, at the third-party storage provider, an edit distance value between the encrypted query and at least a portion of the plurality of encrypted documents, wherein the computing comprises communicating with an entity to work together to compute the edit distance value, wherein the entity is provided the at least one encryption key from the data owner; the communicating comprising (i) providing, from the third-party storage provider to the entity, an encrypted function of an edit distance matrix and (ii) receiving, from the entity at the third-party storage provider, an encrypted edit distance value computed by the entity from the encrypted function of the edit distance matrix; and computer readable program code configured to return, from the third-party storage provider, the encrypted edit distance value to the query user.

A further aspect of the invention provides a method, comprising: receiving, from an entity at a first third-party storage provider, a plurality of encrypted documents, each of the plurality of encrypted documents being encrypted by the entity using at least one encryption key and wherein the at least one encryption key is provided to a second third-party storage provider from the entity; receiving, at the first third-party storage provider from a user, an encrypted query requesting computation of an edit distance value against the plurality of encrypted documents, wherein the encrypted query is encrypted using the at least one encryption key; computing, at the first third-party storage provider, an encrypted matrix using the encrypted query against the plurality of encrypted documents; providing, to the second third-party storage provider from the first third-party storage provider, the encrypted matrix; receiving, at the first third-party storage provider from the second third-party storage provider, an encrypted edit distance value, wherein the encrypted edit distance value is computed by the second third-party storage provider via decryption of the encrypted matrix using the at least one encryption key; and providing, to the user from the first third-party storage provider, the encrypted edit distance value, wherein the user decrypts the encrypted edit distance value using the at least one encryption key.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Third-party database service providers are very useful and helpful to data owners. Rather than having to store and manage data, the data owner can simply transfer the data to the third-party. Since the third-party is generally accessible over the Internet, both the data owner and client devices can access the data. Therefore, the third-party database service provider provides an efficient, cost-effective, and scalable data storage and management solution to data owners. However, a problem with storing data at a third-party storage provider is that the data owner loses control over the data. Rather than maintaining the data on-site, the data owner is now shipping the data to a database service provider. In other words, the data owner cannot ensure that the data remains secure. Specifically, the third-party storage system may attempt to learn information regarding the data. In other words, the database service provider is also curious about the data and may misuse the data for purposes other than merely storing the data.

One solution is to encrypt the data before the data are stored at the third-party. In other words, before the data owner transfers the data to the third-party, the data owner encrypts the data using an encryption scheme. However, encrypting the data before transfer to the third-party can create problems. For example, if a user is attempting to query the data that are stored at the third-party, the third-party would need to be able to perform the computation. However, if the data are encrypted, the third-party would be unable to effectively answer the query. For example, if the user is providing a query that requires an edit distance value computation, the third-party would be unable to perform this computation unless the data were decrypted. Providing the third-party the information needed to decrypt the data would allow the third-party access to the data, thereby negating the purpose for encrypting the data.

An edit distance computation is a technique for quantifying or identifying how dissimilar two strings are as compared to one another. The edit distance computation computes how many operations (e.g., insertion, deletion, substitution, etc.) are required to transform one string into the other string. The edit distance computation has many applications, for example, genomic data processing (DNA analysis), spell correction, entity resolution and matching, determining the longest common subsequence of two strings, and the like. Thus, an edit distance computation is a frequently requested query from data users.

One current technique allows for computation of an edit distance value on encrypted data. However, this technique is specifically designed and fine-tuned for genomic data that are two bits long. In this technique, the data are encrypted bit by bit using a levelled fully homomorphic encryption (LFHE) scheme. The query is also encrypted bit by bit using the LFHE scheme. The system can then compute the edit distance using the LFHE cipher text. However, this computation can take many hours or even days. For example, if both strings are of a length of 50, the computation takes greater than 24 hours. Additionally, the entire application has to use the LFHE scheme which is not compatible with other cryptosystems. Additionally, the LFHE scheme is very hard to scale which makes it infeasible to migrate the application to a third-party.

Accordingly, the techniques and systems as described herein provide a system and technique for computing an edit distance value on encrypted data stored at a third-party storage provider using another entity that does not collude with the third-party storage provider. A data owner may provide a plurality of encrypted documents to a third-party storage provider for storage at the third-party storage provider. The documents are encrypted by the data owner using at least one encryption key. This encryption key is provided to a second entity that is separate from the third-party storage provider. The second entity may be a second third-party storage provider, a query user, trusted hardware, a hybrid cloud, or other entity that does not collude with the third-party storage provider.

The third-party storage provider may then receive an encrypted query from a query user that requires the computation of an edit distance value. The query is encrypted using the same at least one encryption key that was used by the data owner to encrypt the plurality of documents. The third-party storage provider then works with the second entity to compute the edit distance value. This computation requires that the third-party storage provider compute a function of the encrypted data against the encrypted query. The encrypted function is then provided to the second entity which is able to compute the edit distance value by decrypting the encrypted function and performing additional functions on the decrypted function, potentially by following an interactive protocol with the third party storage provider. Once the second entity has computed the edit distance value, the second entity encrypts the edit distance value and returns this encrypted edit distance value to the third-party storage provider. The third-party storage provider then provides the encrypted edit distance value to the query user who can decrypt the encrypted edit distance value using the at least one encryption key. Therefore, the third-party storage provider never sees decrypted data and the second entity never sees the encrypted data as provided to the third-party storage provider. Thus, neither the third-party storage provider nor the second entity has enough information to learn details of the data provided by the data owner.

Such a system provides a technical improvement over current systems for computing edit distance values on encrypted data. The described system provides a technique that allows for the computation of an edit distance value while still preserving the encryption and preventing the third-party from accessing the plaintext data, which is not possible using current schemes. Additionally, the described system does not require the use of the LFHE scheme. Thus, the described system is significantly faster than the LFHE scheme. For example, if both strings are a length of 50, instead of take more than 24 hours, the described system can compute the edit distance value in minutes. Additionally, since the described system does not use the LFHE scheme, the entire application is scalable and is, therefore, able to be migrated to a third-party, which allows for more flexibility by a data owner. Thus, the described system and method provide a system that allows for computation of an edit distance value without exposing encrypted data to a third-party and is more flexible in terms of the encryption scheme used to encrypt the data, thereby resulting in a secure, faster, computationally efficient, and more scalable application.

Figure 1:
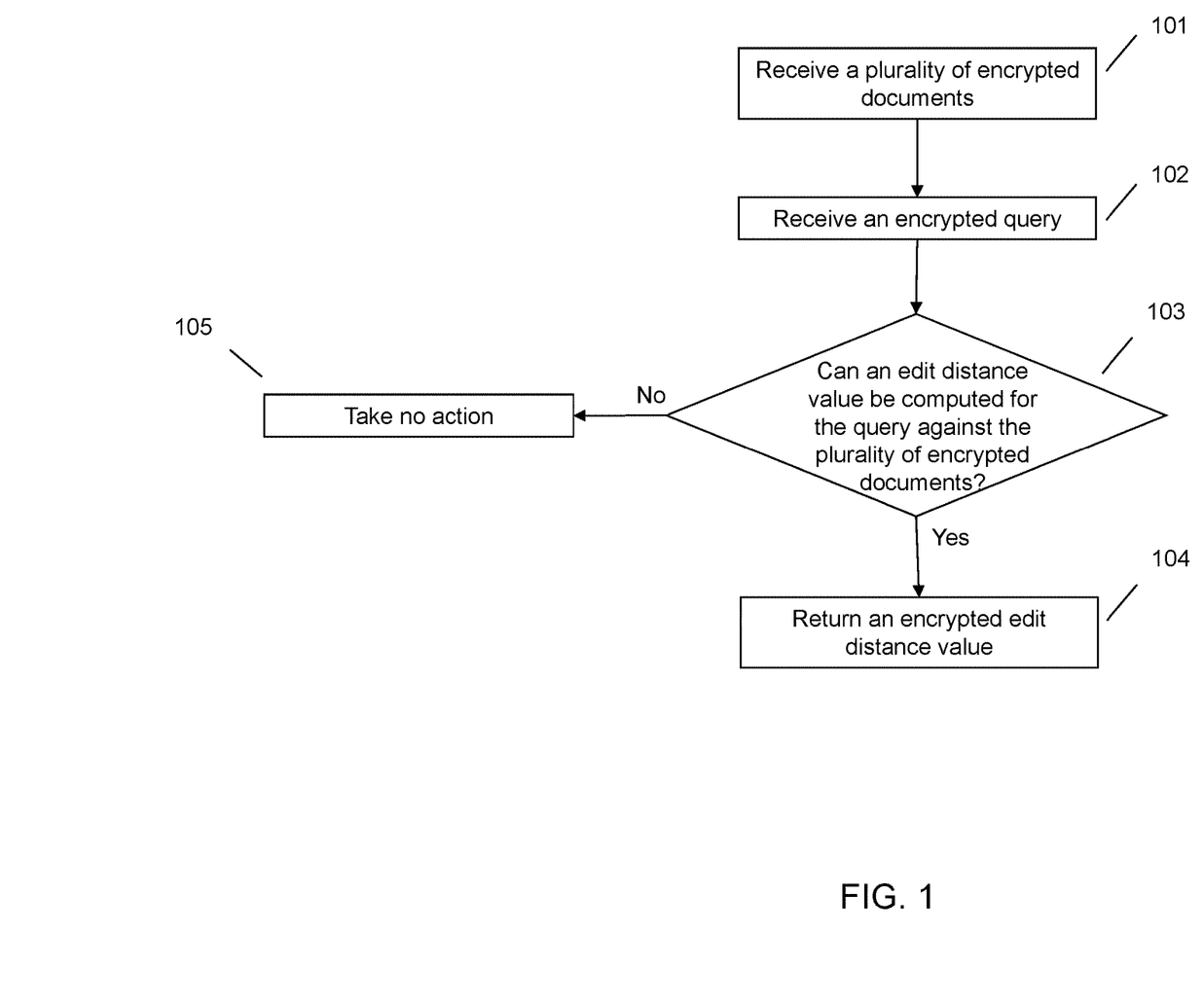
FIG. 1 illustrates a method of computing an edit distance value on encrypted data using non-colluding entities.

FIG. 1 illustrates a method for computing an edit distance value on encrypted data stored at a third-party storage provider using another entity that does not collude with the third-party storage provider. At 101 a data owner provides a plurality of encrypted documents to a third-party storage provider for storage by the third-party storage provider. The data owner encrypts each document character by character to create the encrypted document. An encrypted database can then be generated that includes an encrypted set containing the encryption of all the documents which the data owner has. This encrypted database is then provided to the third-party storage provider for storage.

The data owner encrypts each of the plurality of encrypted documents using an encryption scheme and at least one encryption key. Encryption of the documents by the data owner is performed using a semantically secure additive homomorphic encryption scheme, for example, a Pallier Encryption Scheme. While the example of a Pallier Encryption Scheme will be used here throughout, it should be understood that any type of semantically secure additive homomorphic encryption scheme may be used. To perform the encryption, the data owner generates at least one encryption key. While the data owner may generate a public encryption key which can be made publicly available, the data owner also generates a private or secret key. This private or secret key is shared with both query users and a second entity that is separate from the third-party storage provider that will store the plurality of encrypted documents.

The third-party storage provider and the second entity may be part of a federated cloud model, where both the third-party storage provider and the second entity are cloud devices or systems. These cloud devices are systems that may be independent cloud service providers or may be differently managed servers of the same cloud service provider. However, in the federated cloud model, the third-party storage provider and the second entity are non-colluding, meaning these entities will not share data among each other in order to derive information regarding data stored at each of the entities. In other words, the third-party storage provider stores the encrypted database and does not share this information with the second entity. On the other hand, the second entity stores or has access to the encryption key(s) and does not share this information with the third-party storage provider. Therefore, neither the third-party storage provider nor the second entity can fully decrypt the encrypted data being stored by the third-party storage provider. While the example of a federated cloud model will be used here throughout, it should be understood that the second entity does not need to be a cloud device or system. Rather, a query user already having the encryption key(s) can be used as the second entity, a trusted hardware device may be used as the second entity, a hybrid cloud may be used as the second entity, or any other trusted entity may be used as the second entity.

At 102 the third-party storage provider may receive an encrypted query from a query user. The query user may be a client of the data owner, a service provided by the data owner, or other user trusted or authorized by the data owner. The query is encrypted by the query user using the same at least one encryption key that was used to encrypt the plurality of documents. As stated before, the at least one encryption key is provided to the query user by the data owner. The encryption of the query occurs similarly to the encryption of the plurality of documents. Specifically, the query is encrypted character-by-character using the same encryption scheme that was used to encrypt the plurality of documents. The query user then provides this encrypted query to the third-party storage provider. The query can be of many forms. However, for purposes of this disclosure, the query requires computation of an edit distance value against the plurality of encrypted documents, either as an end result or as an intermediate step to be used in a final computation at a later time.

The system then determines if an edit distance value can be computed for the query against the plurality of encrypted documents at 103. To compute the edit distance value, the third-party storage provider must communicate with the second entity. This communication allows for computation of the edit distance value without revealing information regarding the plaintext version of the plurality of documents to either the third-party storage provider or the second entity. Accordingly, the third-party and the second entity enter into an interactive protocol where they share information in order to compute the edit distance value, but do not share information that would allow the other entity to derive information regarding the plaintext version of the encrypted documents. In other words, the third-party and the second entity work together to compute the edit distance value but do not collude with each other to derive information regarding the plaintext version of the encrypted documents.

To perform the computation, the third-party only sees the encrypted data and the encrypted query. From the encrypted data and the encrypted query, the third-party computes an encrypted function of the data. The encrypted function is a function of an edit distance matrix. This encrypted function of the edit distance matrix is provided to the second entity. Thus, the second entity never sees the encrypted data as it was provided to the third-party. The second entity can decrypt the encrypted function to see the plaintext version of the encrypted function. The decryption of the encrypted function can be performed by the second entity using the at least one encryption key that was provided to the second entity from the data owner. By virtue of both (i) the data that were provided to the third-party and (ii) the query provided from the query user being encrypted using the same encryption scheme and using the same at least one encryption key, the encrypted function provided to the second entity is also encrypted based upon the same encryption scheme and the at least one encryption key. Using the plaintext version of the encrypted function, the second entity can compute the edit distance value, potentially by following an interactive protocol with the third party storage provider. The second entity then encrypts the edit distance value using the same encryption scheme and at least one encryption key and provides the encrypted edit distance value to the third-party.

An example algorithm for the computation of the edit distance matrix can be seen below.

| Algorithm for Matrix M |
|---|
| for i=1 to n do:<br>    for j=1 to m do:<br>        C1:<br>        (a) Choose a random r.<br>        (b) $X_{ij} = E_{pk}(u_i) * (E_{pk}(v_j))^{N-1} = E_{pk}(u_i - v_j)$<br>        (c) $Y_{ij} = X_{ij}^r = E_{pk}(r * (u_i - v_j))$<br>        (d) Send $Y_{ij}$ to C2.<br>        C2:<br>        (e) Receive $Y_{ij}$ and $Z_{ij} = D_{sk}(Y_{ij})$.<br>        (f) if $Z_{ij} = 0$, $\alpha_{ij} = 0$, else $\alpha_{ij} = 1$.<br>        (g) Send $E_{pk}(\alpha_{ij})$ to C1.<br>        C1:<br>        (h) Receive $E_{pk}(\alpha_{ij})$ and set $M_{ij} = E_{pk}(\alpha_{ij})$. |

In this algorithm, the third-party performs the steps listed under C1, steps (a), (b), (c), (d), and (h). The second entity performs the steps listed under C2, steps (e), (f), and (g). Matrix M can then be used to compute the encrypted edit distance using the below algorithm:

| Algorithm for Matrix F |
|---|
| for i=1 to n do:<br>    for j=1 to m do:<br>        C1:<br>        (a) $A_{ij} = F_{i-1,j-1} * M_{ij} = E_{pk}(D_{i-1,j-1} + \alpha_{ij})$<br>        (b) $B_{ij} = F_{i-1,j} * E_{pk}(1) = E_{pk}(D_{i-1,j} + 1)$<br>        (c) $C_{ij} = F_{i,j-1} * E_{pk}(1) = E_{pk}(D_{i,j-1} + 1)$<br>        (d) $A'_{ij} = SBD(A_{ij})$<br>        (e) $B'_{ij} = SBD(B_{ij})$<br>        (f) $C'_{ij} = SBD(C_{ij})$<br>        (h) $F'_{i,j} = MIN(A'_{ij}, MIN(B'_{ij}, C'_{ij}))$ |

In this algorithm, the third-party performs steps (a), (b), (c), and (d). The second entity performs steps (e), (f), and (h), with the result of (h) being the encrypted edit distance. Accordingly, the second entity performs the functions SBD (Secure Bit Decomposition) and MIN (Minimum finding routine), which are functions for the Paillier cryptosystem.

If the system is not successful in computing an edit distance value at 103, the system may take no action at 105. Alternatively, the system may provide an indication that an edit distance value could not be computed. Alternatively, if the system is successful at computing an edit distance value at 103, the system may return the encrypted edit distance value to the query user at 104. In other words, once the third-party receives the encrypted edit distance value from the second entity, the third-party can provide this encrypted edit distance value to the query user. Since the edit distance value was encrypted using the at least one encryption key, which was also provided to the query user, the query user can decrypt the encrypted edit distance value using the at least one encryption key. The query user can then use the edit distance value as desired, for example, as the final answer for the query or to be used in a subsequent computation by the query user.

Figure 2:
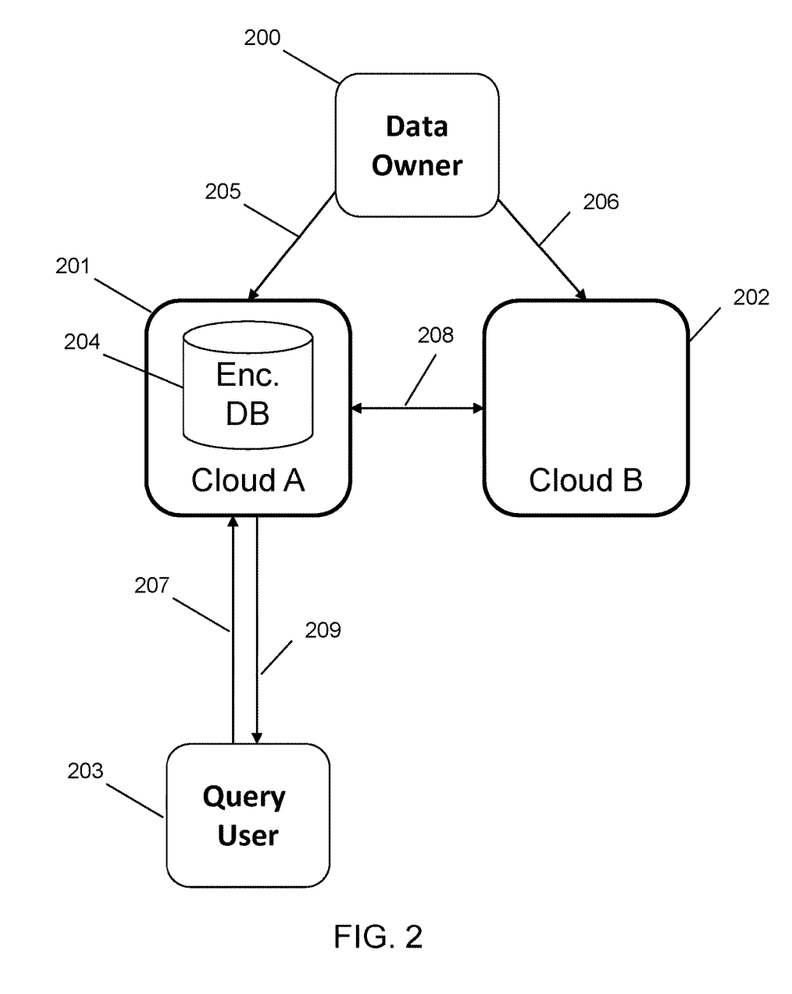
FIG. 2 illustrates an example of an edit distance value computation system.

As a brief summary, referring to FIG. 2, the data owner 200 transfers 205 an encrypted database 204 to Cloud A 201. The data owner 200 shares 206 the at least one encryption key with Cloud B 202. Cloud A 201 receives an encrypted query 207 from the query user 203. Cloud A 201 and Cloud B 202 enter into an interactive protocol 208 to compute an encrypted edit distance value related to the encrypted query 207 and the encrypted database 204. Once the encrypted edit distance value is computed, Cloud A 201 returns 209 this encrypted edit distance value to query user 203. Query user 203 can then decrypt the encrypted edit distance value using the at least one encryption key to determine the edit distance value.

Thus, the described system and method provide an improvement over a conventional system for edit distance computation on encrypted data. The system provides a technique that allows for computation of an edit distance value while preserving the encryption scheme, thereby preventing the third-party storage provider from deriving or learning information regarding the encrypted documents being stored by the third-party storage provider. Additionally, the described system does not require the use of the LFHE scheme, thereby providing a system that is significantly faster and more scalable as compared to the LFHE scheme. Finally, since the system does not require the LFHE scheme, the system can be used for edit distance computation on encrypted data other than genomic data.

Figure 3:
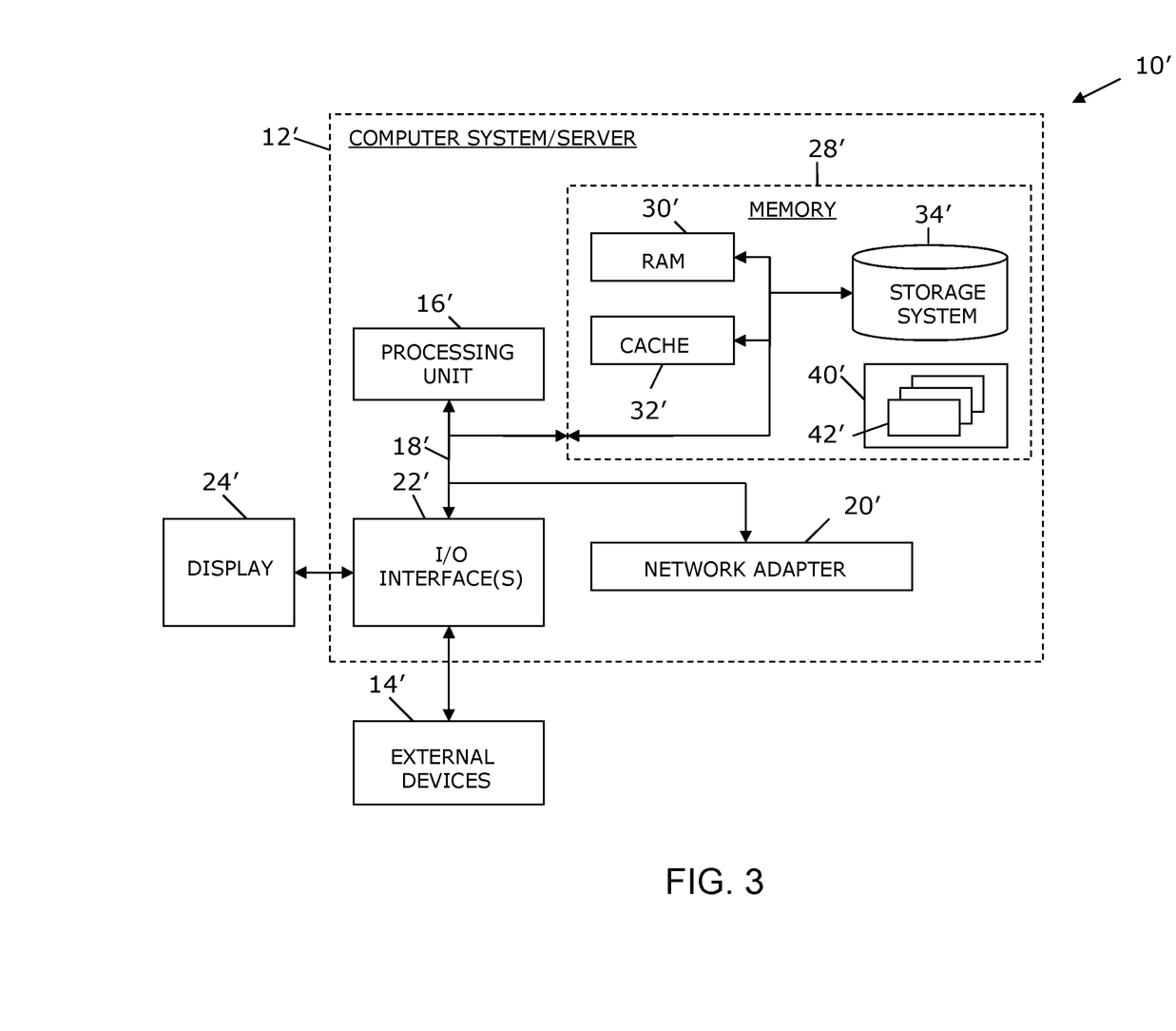
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
  receiving, at a third-party storage provider and from a data owner, a plurality of encrypted documents, wherein each of the plurality of encrypted documents is encrypted by the data owner using at least one encryption key;
  receiving, at the third-party storage provider from a query user, an encrypted query, wherein the query is encrypted using the at least one encryption key;
  computing, at the third-party storage provider, an edit distance value between the encrypted query and at least a portion of the plurality of encrypted documents, wherein the computing comprises communicating with an entity to work together to compute the edit distance value, wherein the entity is provided the at least one encryption key from the data owner;
  the communicating comprising (i) providing, from the third-party storage provider to the entity, an encrypted function of an edit distance matrix and (ii) receiving, from the entity at the third-party storage provider, an encrypted edit distance value computed by the entity from the encrypted function of the edit distance matrix; and
  returning, from the third-party storage provider, the encrypted edit distance value to the query user.

2. The method of claim 1, wherein the query user acts as the entity.

3. The method of claim 1, wherein the entity comprises a second third-party storage provider.

4. The method of claim 1, wherein the entity comprises a trusted hardware device.

5. The method of claim 1, wherein the encrypted documents and the encrypted query are encrypted using a semantically secure additive homomorphic encryption scheme.

6. The method of claim 1, wherein the computing the edit distance value comprises performing a secure bit decomposition function and a minimum finding routine function.

7. The method of claim 1, wherein the encrypted edit distance value computed by the entity is computed by decrypting the encrypted function of the edit distance matrix using the at least one encryption key.

8. The method of claim 7, wherein the computing the encrypted edit distance value comprises computing the edit distance value from the decrypted function.

9. The method of claim 8, wherein the computing the encrypted edit distance value comprises (i) encrypting the edit distance value using the at least one encryption key and (ii) returning the encrypted edit distance value to the third-party storage provider.

10. An apparatus, comprising:
at least one processor; and
a computer readable storage medium having computer readable program code embodied therewith and executable by the at least one processor, the computer readable program code comprising:
computer readable program code configured to receive, at a third-party storage provider and from a data owner, a plurality of encrypted documents, wherein each of the plurality of encrypted documents is encrypted by the data owner using at least one encryption key;
computer readable program code configured to receive, at the third-party storage provider from a query user, an encrypted query, wherein the query is encrypted using the at least one encryption key;
computer readable program code configured to compute, at the third-party storage provider, an edit distance value between the encrypted query and at least a portion of the plurality of encrypted documents, wherein the computing comprises communicating with an entity to work together to compute the edit distance value, wherein the entity is provided the at least one encryption key from the data owner;
the communicating comprising (i) providing, from the third-party storage provider to the entity, an encrypted function of an edit distance matrix and (ii) receiving, from the entity at the third-party storage provider, an encrypted edit distance value computed by the entity from the encrypted function of the edit distance matrix; and
computer readable program code configured to return, from the third-party storage provider, the encrypted edit distance value to the query user.

11. A computer program product, comprising:
a computer readable storage medium having computer readable program code embodied therewith, the computer readable program code executable by a processor and comprising:
computer readable program code configured to receive, at a third-party storage provider and from a data owner, a plurality of encrypted documents, wherein each of the plurality of encrypted documents is encrypted by the data owner using at least one encryption key;
computer readable program code configured to receive, at the third-party storage provider from a query user, an encrypted query, wherein the query is encrypted using the at least one encryption key;
computer readable program code configured to compute, at the third-party storage provider, an edit distance value between the encrypted query and at least a portion of the plurality of encrypted documents, wherein the computing comprises communicating with an entity to work together to compute the edit distance value, wherein the entity is provided the at least one encryption key from the data owner;
the communicating comprising (i) providing, from the third-party storage provider to the entity, an encrypted function of an edit distance matrix and (ii) receiving, from the entity at the third-party storage provider, an encrypted edit distance value computed by the entity from the encrypted function of the edit distance matrix; and
computer readable program code configured to return, from the third-party storage provider, the encrypted edit distance value to the query user.

12. The computer program product of claim 11, wherein the query user acts as the entity.

13. The computer program product of claim 11, wherein the entity comprises a second third-party storage provider.

14. The computer program product of claim 11, wherein the entity comprises a trusted hardware device.

15. The computer program product of claim 11, wherein the encrypted documents and the encrypted query are encrypted using a semantically secure additive homomorphic encryption scheme.

16. The computer program product of claim 11, wherein the computing the edit distance value comprises performing a secure bit decomposition function and a minimum finding routine function.

17. The computer program product of claim 11, wherein the encrypted edit distance value computed by the entity is computed by decrypting the encrypted function of the edit distance matrix using the at least one encryption key.

18. The computer program product of claim 17, wherein the computing the encrypted edit distance value comprises computing the edit distance value from the decrypted function.

19. The computer program product of claim 18, wherein the computing the encrypted edit distance value comprises (i) encrypting the edit distance value using the at least one encryption key and (ii) returning the encrypted edit distance value to the third-party storage provider.

20. A method, comprising:
receiving, from an entity at a first third-party storage provider, a plurality of encrypted documents, each of the plurality of encrypted documents being encrypted by the entity using at least one encryption key and wherein the at least one encryption key is provided to a second third-party storage provider from the entity;
receiving, at the first third-party storage provider from a user, an encrypted query requesting computation of an edit distance value against the plurality of encrypted documents, wherein the encrypted query is encrypted using the at least one encryption key;
computing, at the first third-party storage provider, an encrypted matrix using the encrypted query against the plurality of encrypted documents;
providing, to the second third-party storage provider from the first third-party storage provider, the encrypted matrix;
receiving, at the first third-party storage provider from the second third-party storage provider, an encrypted edit distance value, wherein the encrypted edit distance value is computed by the second third-party storage provider via decryption of the encrypted matrix using the at least one encryption key; and
providing, to the user from the first third-party storage provider, the encrypted edit distance value, wherein the user decrypts the encrypted edit distance value using the at least one encryption key.

* * * * *